United States Patent
Trainor et al.

(10) Patent No.: US 9,569,004 B2
(45) Date of Patent: Feb. 14, 2017

(54) SWIPE TOOLBAR TO SWITCH TABS

(71) Applicant: Google Inc., Mountain View, CA (US)

(72) Inventors: David Andrew Trainor, Sunnyvale, CA (US); Arnaud Claude Weber, Saratoga, CA (US); Carson L. Holgate, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 19 days.

(21) Appl. No.: 13/973,970

(22) Filed: Aug. 22, 2013

(65) Prior Publication Data

US 2015/0058787 A1 Feb. 26, 2015

(51) Int. Cl.
 *G06F 3/048* (2013.01)
 *G06F 3/01* (2006.01)
 *G06F 3/0483* (2013.01)
 *G06F 3/0488* (2013.01)
 *G06F 3/0485* (2013.01)

(52) U.S. Cl.
 CPC ............ *G06F 3/017* (2013.01); *G06F 3/0483* (2013.01); *G06F 3/04883* (2013.01); *G06F 3/0485* (2013.01)

(58) Field of Classification Search
 CPC ............................ G06F 3/0483; G06F 3/04833
 USPC .................................................. 715/777, 863
 See application file for complete search history.

(56) References Cited

U.S. PATENT DOCUMENTS

| | | |
|---|---|---|
| 5,644,737 A | 7/1997 | Tuniman et al. |
| 6,577,330 B1 | 6/2003 | Tsuda et al. |
| 2006/0161861 A1 | 7/2006 | Holecek et al. |
| 2006/0277472 A1 | 12/2006 | Yodo et al. |
| 2008/0036743 A1 | 2/2008 | Westerman et al. |
| 2010/0169772 A1* | 7/2010 | Stallings et al. ............... 715/702 |
| 2010/0211872 A1 | 8/2010 | Rolston et al. |
| 2011/0209099 A1 | 8/2011 | Hinckley et al. |
| 2011/0296351 A1 | 12/2011 | Ewing, Jr. et al. |
| 2012/0060111 A1 | 3/2012 | Kim |
| 2012/0066628 A1 | 3/2012 | Ens et al. |
| 2012/0131495 A1 | 5/2012 | Goossens et al. |
| 2012/0210270 A1* | 8/2012 | Kwon ................... G06F 3/0485 715/777 |
| 2012/0278756 A1 | 11/2012 | Shah et al. |
| 2012/0317503 A1* | 12/2012 | Noh ..................... G06F 3/04883 715/760 |
| 2013/0061159 A1 | 3/2013 | Tseng et al. |

(Continued)

OTHER PUBLICATIONS

Stack Overflow "Android horizontal swipe top menu," Dec. 2012, <http://stackoverflow.com/questions/13905606/android-horizontal-swipe-top-menu>.

(Continued)

*Primary Examiner* — Omar Abdul-Ali
(74) *Attorney, Agent, or Firm* — McDermott Will & Emery LLP

(57) ABSTRACT

Aspects of the subject technology relate to switching tabs in an application. A system is configured to provide for the display an application interface. The application interface includes a toolbar and content associated with a first tab from a plurality of tabs open in the application. The system is further configured to receive, via an input device, a swipe gesture on the toolbar in the application interface and switch, in response to the receiving of the swipe gesture, from displaying in the application interface the content associated with the first tab to displaying content associated with a second tab in the plurality of tabs.

20 Claims, 9 Drawing Sheets

(56) References Cited

U.S. PATENT DOCUMENTS

| | | |
|---|---|---|
| 2013/0061160 A1 | 3/2013 | Tseng |
| 2013/0145290 A1 | 6/2013 | Weber et al. |
| 2013/0205244 A1 | 8/2013 | Decker et al. |
| 2013/0205304 A1 | 8/2013 | Jeon et al. |
| 2013/0212517 A1* | 8/2013 | Liu .............................. 715/777 |
| 2013/0246964 A1* | 9/2013 | Kazawa et al. ............... 715/777 |
| 2014/0068475 A1* | 3/2014 | Li et al. ........................ 715/765 |
| 2015/0100552 A1 | 4/2015 | Malis |

OTHER PUBLICATIONS

Infragistics, "What's new in iOS7? Neither features nor functions, but user experience!," published Jul. 30, 2013, retrieved from http://www.infragistics.com/community/blogs/ux/archive/2013/07/30/what-s-new-in-ios-7-neither-features-nor-functions-but-user-experience.aspx.

Grazing Browser Features, Dec. 2011, retrieved from http://grazingbrowser.com/features.php?device=iphone.

Brinkmann, "Display Open Tab Count in Firefox," published Dec. 7, 2011, retrieved from http://www.ghacks.net/2011/12/07/displayopentabcountinfirefox/.

* cited by examiner

SWIPE TOOLBAR TO SWITCH TABS

FIELD

The present disclosure generally relates to user interface interactions and, in particular, to switching tabs in an application.

BACKGROUND

Many applications are configured to be able to load content from different sources to be loaded. A user may then switch between the content within an interface provided by the application. For example, a web browser may allow for multiple web pages or other content to be open at the same time by using browser tabs. The content of one of the tabs (e.g., an active tab) may be displayed in an interface (e.g., a window) provided by the web browser. There may also be a tab toolbar showing open tabs in the web browser. To switch between tabs, a user may select a desired tab which causes the web browser to display the contents of the desired tab.

In some cases, space on a screen or on the application interface may be at a premium and the tab toolbar may take up valuable space. Furthermore, for touch screen devices, using the tab toolbar to switch between tabs may be difficult because the tabs shown in the tab toolbar may be small and hard for a user to select using the user's finger or a stylus.

SUMMARY

Aspects of the subject technology relate to a system for switching tabs in an application. The system includes one or more processors and a machine-readable medium comprising instructions stored therein, which when executed by the one or more processors, cause the one or more processors to perform operations. The operations include providing for the display an application interface, the application interface comprising a toolbar and content associated with a first tab from a plurality of tabs open in the application, receiving, via an input device, a swipe gesture on the toolbar in the application interface, and switching, in response to the receiving of the swipe gesture, from displaying in the application interface the content associated with the first tab to displaying content associated with a second tab in the plurality of tabs.

Additional aspects of the subject technology relate to a computer-implemented method for switching tabs in an application. The method includes displaying an application interface on a touch screen, the application interface comprising a toolbar and content associated with a first tab from a plurality of tabs open in the application, receiving, on the touch screen, a swipe gesture on the toolbar in the application interface, and switching, in response to the receiving of the swipe gesture, from displaying the content associated with the first tab to displaying content associated with a second tab in the plurality of tabs.

Aspects of the subject technology may also relate to a non-transitory machine-readable medium comprising instructions stored therein, which when executed by a machine, cause the machine to perform operations for switching tabs in a web browser. The operations include displaying a browser interface on a touch screen, the browser interface comprising an address toolbar and content associated with a first tab from a plurality of tabs open in a web browser, receiving, on the touch screen, a swipe gesture on the address toolbar in the application interface, and switching, in response to the receiving of the swipe gesture, from displaying the content associated with the first tab to displaying content associated with a second tab in the plurality of tabs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, a system is configured to enable a user to switch between multiple tabs in an application by using a swiping gesture across a toolbar. The swipe gesture may include, for example, swiping a finger or a stylus across a toolbar displayed on a touch screen of a computing device. The toolbar may be provided as a part of an application, such as an address bar of a web browser where users may view or enter a uniform resource locator (URL).

The tab switching process may include displaying the application on a touch screen. The application may appear on the touch screen with a toolbar and content associated with one of the tabs open in the application. The tab displayed on the touch screen may be considered the active tab while other tabs that open in the application which are not displayed may be considered inactive tabs. A user may swipe the toolbar displayed on the touch screen to switch from the tab currently displayed on the touch screen to another tab open in the application. Upon detecting a swipe gesture on the toolbar for the application, the application is configured to switch from displaying the content associated with the first tab to displaying content associated with another tab open in the application.

By providing the user with a means to switch between tabs in a web browser using a swipe gesture on an address bar, other user interface elements used for switching tabs do not need to be displayed, thus saving space for other content (e.g., web page content or other application interface components) or allowing existing content to be enlarged. Furthermore, whether or not other interface elements for switching tabs are displayed, allowing a user to switch between tabs by swiping an address bar provides a convenient method for switching tabs.

Figure 1:
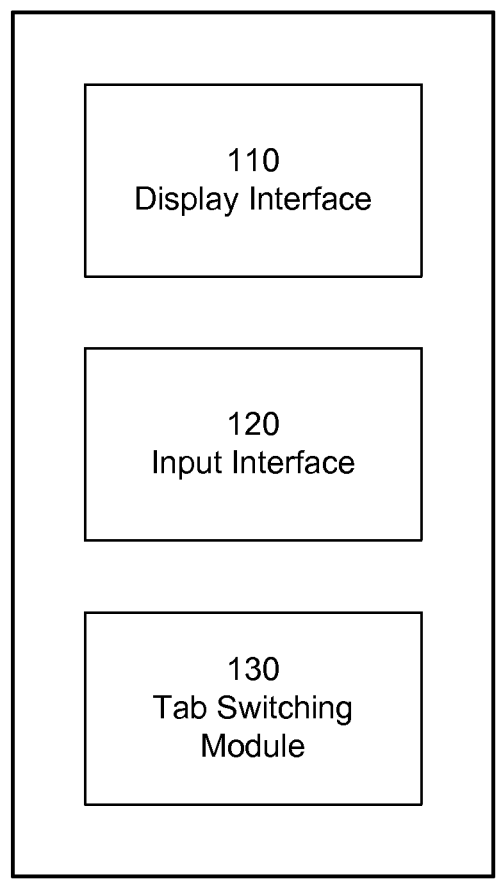
FIG. 1 is a block diagram illustrating an example computing device configured to switch tabs in an application, according to various aspects of the subject technology.

FIG. 1 is a block diagram illustrating an example computing device 100 configured to switch tabs in an application, according to various aspects of the subject technology. The computing device 100 may be, for example, a mobile device (e.g., a smart phone, a global positioning system device, or a tablet computer), a laptop, a desktop computer, a gaming console, a smart television or other appliance, a set top box, or any other computing machine capable of running an application. The application may include, for example, a web browser, a content (e.g., image or video) viewer application, a text or image editor, or any other application that can load multiple tabs of content.

The computing device 100 may include a display interface 110, an input interface 120, and a tab switching module 130. However, in other aspects components may be removed, additional components may be added, or alternative components may be used. In some implementations, the modules or interfaces may include instructions encoded in a non-transitory medium and executed by a processor, computer hardware components, or a combination of both. The components may each also include one or more processors or memories that are used to perform the functions described below or share one or more processors or memories.

The display interface 110 may be configured to manage the display of content on a display device connected to or in communication with the computing device 100. For example, the display interface 110 may be configured to display an application interface on a display device (e.g., a touch screen, a monitor, etc.). The application interface may be displayed in the entire display area for the display device or on a portion of the display area. The application displayed may support a number of open tabs and appear on the display device showing a toolbar (e.g., the address toolbar for a web browser) and content associated with one of the supported tabs.

The input interface 120 is configured to receive user input signals from one or more input devices connected to or in communication with the computing device 100. In some case the input device and the display device may be a part of the same device (e.g., a touch screen device). Although some aspects of the subject technology are discussed with respect to a touch screen input device, other touch-sensitive input devices (e.g., a touchpad or a touch-sensitive display) and other input devices (e.g., a mouse, game controllers, or gyroscopic devices) that can simulate swipe gestures may also be used with an application running on a computing device. For example, the input interface 120 may receive, from an input device, an indication of a swipe gesture at a location corresponding to the toolbar of the application.

In response to receiving the swipe gesture, tab switching module 130 may be configured to switch from displaying the content associated with a first tab to displaying content associated with a second tab. According to some aspects, the tab switching module 130 may determine which tab open on the application to display based on characteristics of the received swipe gesture. For example, as will be described in further detail below, the tab switching module 130 may switch from one tab to another tab based on the direction of the swiping gesture, a length of the swiping gesture, or a starting point and ending point of a swiping gesture.

Figure 2A:
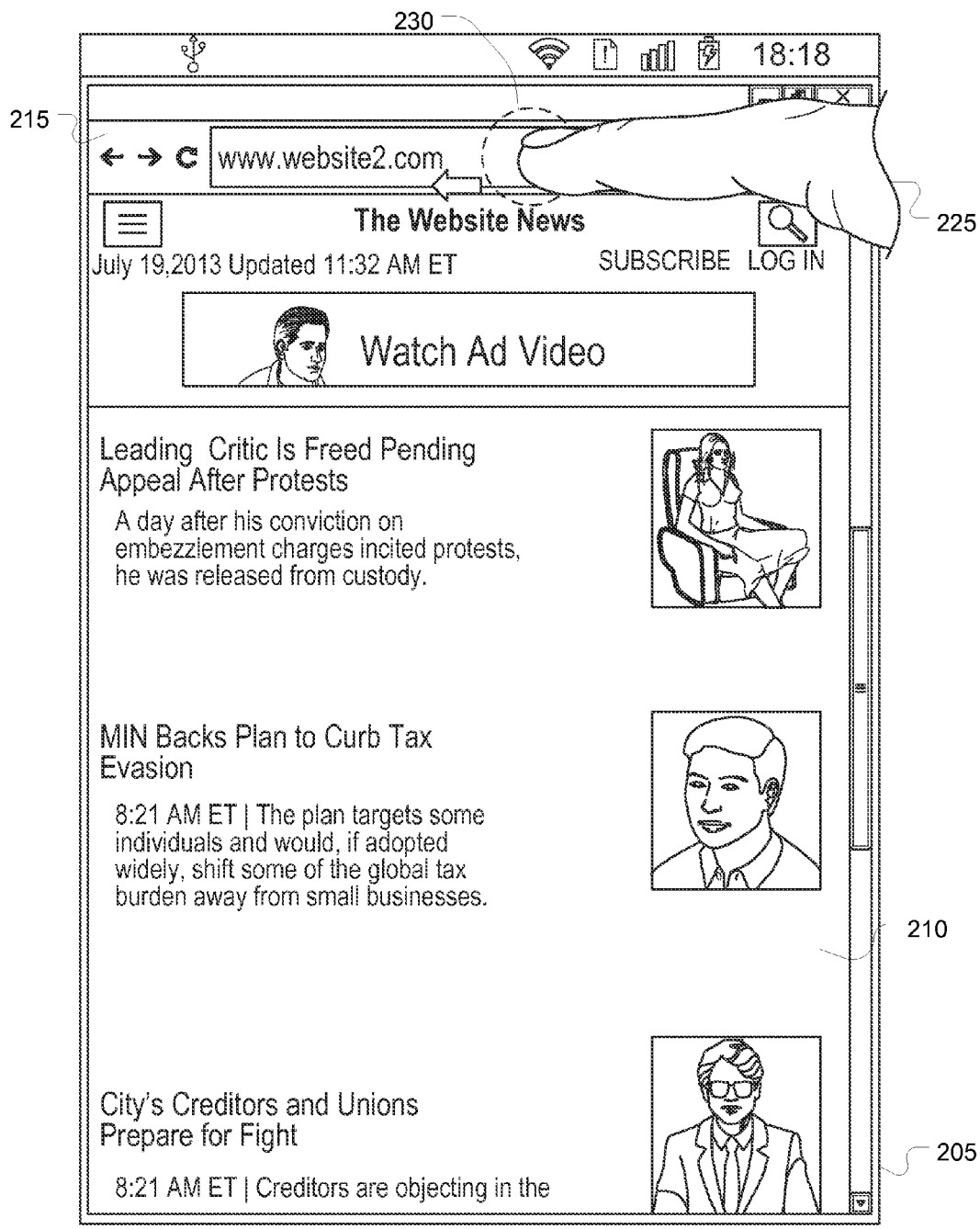
FIG. 2A, FIG. 2B, and FIG. 2C are diagrams illustrating an example scenario where an application interface switches tabs in response to a swipe gesture, in accordance with various aspects of the subject technology.
Figure 2B:
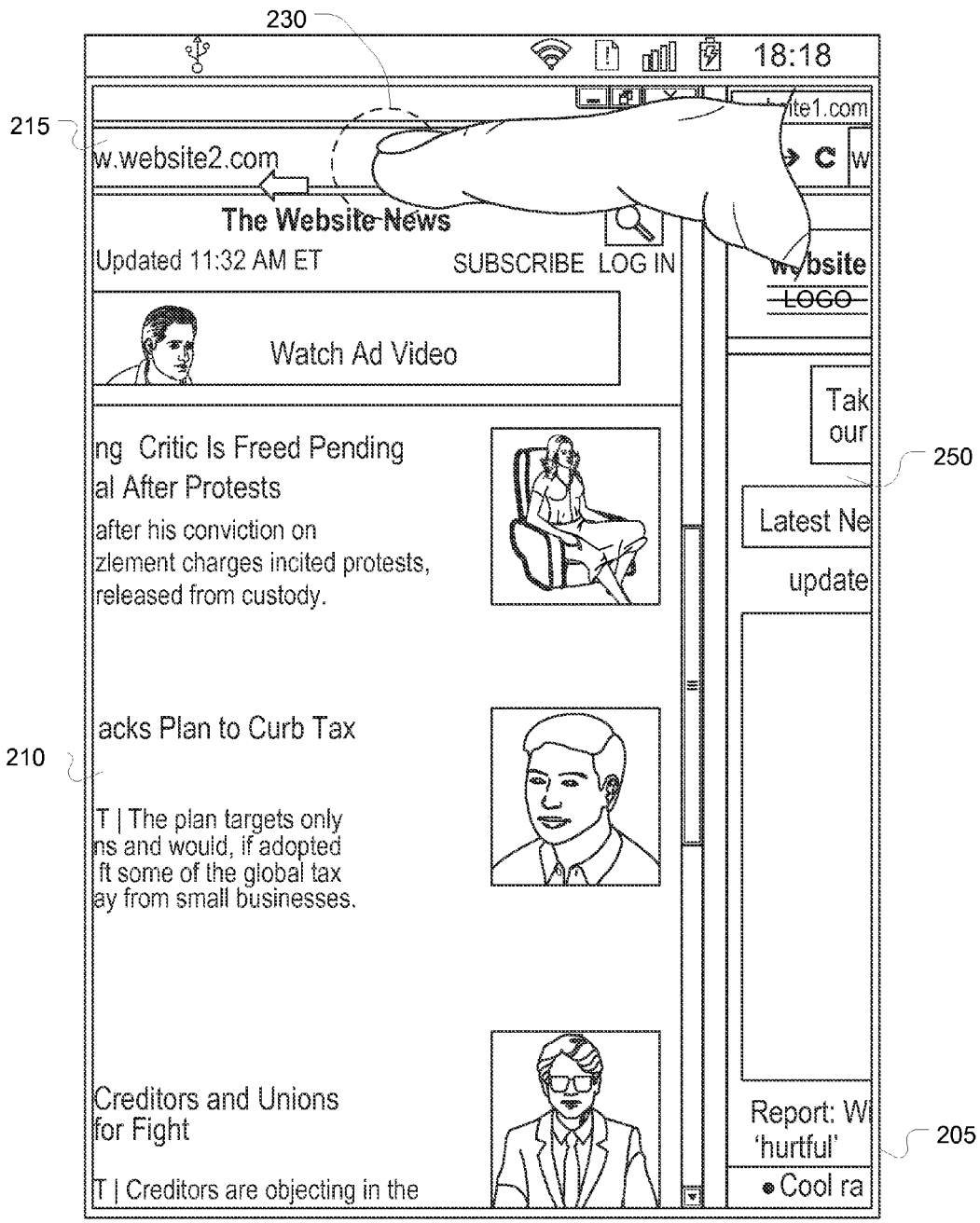
Figure 2C:
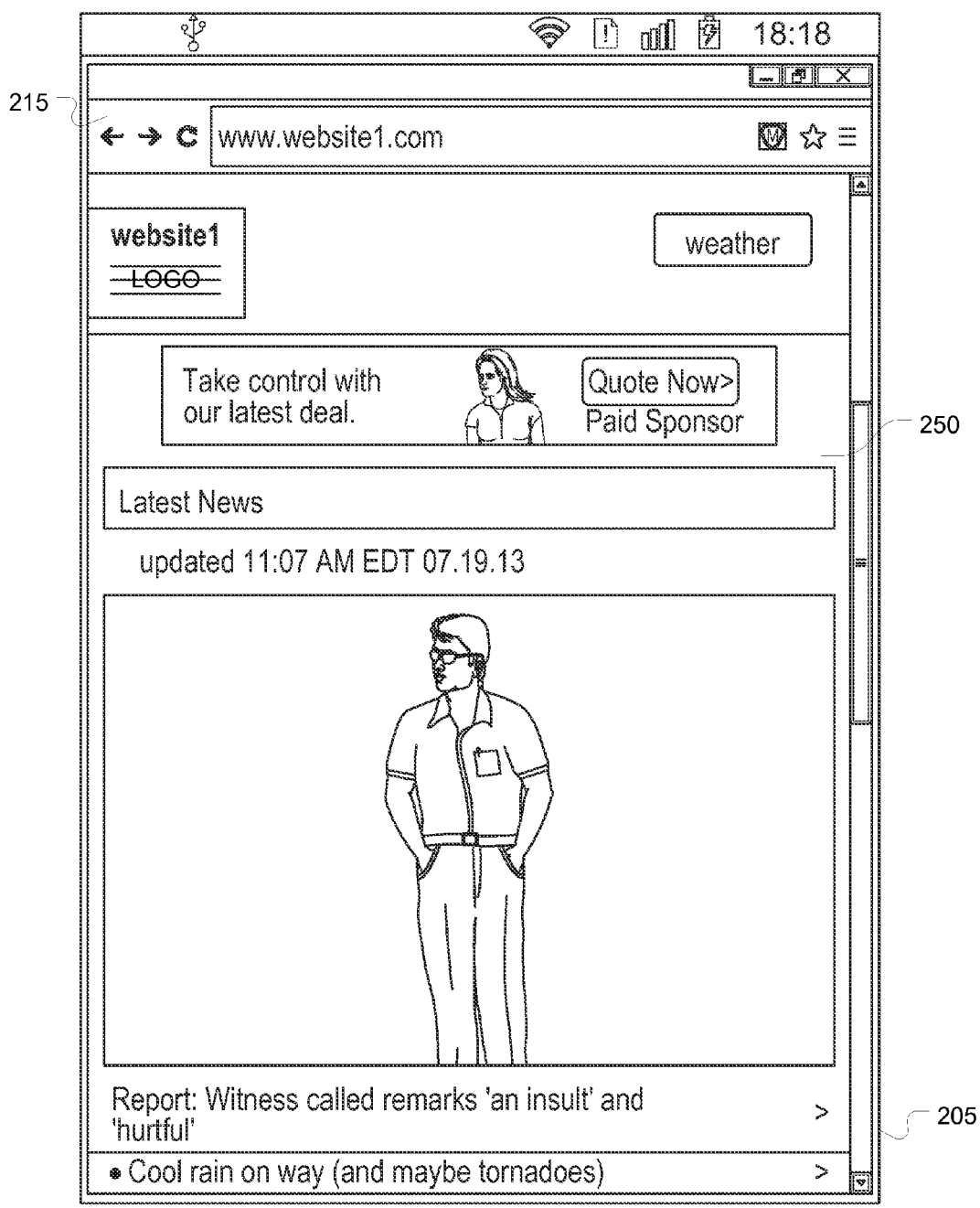

FIG. 2A, FIG. 2B, and FIG. 2C are diagrams illustrating an example scenario where an application interface 205 switches tabs in response to a swipe gesture, in accordance with various aspects of the subject technology. FIG. 2A shows an application interface 205 in the form of a web browser displayed on a touch screen. The application interface 205 may correspond to an application in which multiple tabs are open, however only the content of one tab 210 is shown in the application interface 205.

A toolbar 215 is displayed in the application interface 205 and is configured to receive and display the location or source of the content loaded in the displayed tab 210. For example, in FIG. 2A, the toolbar 215 is an address toolbar for the web browser that displays a uniform resource locator (URL) field. In particular, the address toolbar indicates that the content for the currently active tab 210 is from the URL "www.website2.com."

Some web browsers display a tab switching toolbar or other user interface component near the top of the web browser that allows a user to switch between tabs or that provides an indication of the available tabs. Although multiple tabs may be open in the application, in accordance with some aspects, the application interface 205 displayed on the touch screen does not display any other user interface component that provides an indication of the open tabs. Nor is any other user interface component displayed that allows a user to switch between tabs. Instead, the user may switch tabs by using a swipe gesture on the address bar 215. As a result, the space saved from not needing to display these additional user interface components may be used for other content.

As seen in FIG. 2A, a user may initiate a swipe gesture 230 by making contact with the touch screen with a finger 225 (or stylus) and dragging the finger 225 on the touch screen. Although the swipe gesture 230 in FIG. 2A is a horizontal swipe gesture, in other aspects, vertical swipe gestures or other swipe gestures may also be used. Furthermore, although the toolbar is positioned horizontally at a top portion of the application interface, the toolbar may also be oriented in a different manner (e.g., vertically).

As mentioned above, the tab switching module 130 may switch from one tab to another tab based on the direction of the swiping gesture. For example, the swipe gesture 230 in FIG. 2A is shown occurring to the left. As the swipe gesture 230 on the toolbar 215 occurs, the content of the active tab 210 shown in FIG. 2A may be dragged to the left, as can be seen in FIG. 2B.

FIG. 2B shows that as the swipe gesture 230 continues to the left, the content of the tab 210 previously displayed in the application interface 205 is dragged to the left and the content of another tab 250 open in the application begins to appear in the application interface 205. The content of tab 210 is dragged such that location of the point of contact between the user's finger 225 is the same relative to the displayed content of tab 210 and the toolbar 215.

According to some aspects of the subject technology, at this point, the user may reverse the direction of the swipe gesture 230 if the user desires and return to the right. In response, the content of the tab 210 may be dragged back to the right and return to its original position as seen in FIG. 2A. Accordingly, the user may have a preview of the content of the tab 250 to the right of tab 210 and, if the user does not wish to switch tabs, the user can return the application interface 205 to its original view using the same swipe gesture 230.

If, on the other hand, the user wishes to switch tabs to the tab 250 to the right of tab 210, the user may continue the swipe gesture 230. Once the swipe gesture 230 reaches a threshold, the switching of the tabs from tab 210 to tab 250 will complete. As is seen in FIG. 2C, the switching of tabs from tab 210 to tab 250 is complete and the content of tab 250, the new active tab, is displayed in the application interface 205. The application interface 205 is also shown with the address toolbar 215 showing the URL ("www.website1.com") for the new active tab 250. The threshold may be, for example, an amount of tab 210 that has been dragged off of the displayed area of the application interface 205, an amount of tab 250 that has been dragged onto the displayed area of the application interface 205, or a length of a swipe gesture 230.

As discussed above, the tab switching module 130 may switch from one tab to another tab based on the direction of the swiping gesture, a length of the swiping gesture, or a starting point and ending point of a swiping gesture. For example, as the user makes the swipe gesture, the active tab may switch from the currently displayed tab to a previous tab or a subsequent tab based on the direction of the tab. If there is positional order to the tabs open in the application, the active tab displayed in the application may switch from one tab to another tab positioned in the direction of the swipe (e.g., if the user swipes to the left, a tab to the right of the active tab may become active and be displayed or if the user swipes to the right, a tab to the left of the active tab may become active and be displayed). Although the example illustrated in FIGS. 2A-2C show the user making a swiping gesture 230 to the left, the user may also make a swiping gesture to the right. In such a scenario, the tab to the left of the active tab may be displayed at the end of the swiping gesture.

Furthermore, the tab switching module 130 may switch to tabs immediately adjacent to the active tab or the toolbar may switch to tabs further away from the active tab depending on how far the user swipes. According to one implementation, the tabs may be scrolled through as the user makes the swiping gesture, allowing the user to stop the swiping gesture when the desired tab is reached.

According to various aspects of the subject technology, the application interface may include an additional user interface component that provides the user with an indication of the multiple tabs that the user is switching between may be displayed on the touch screen. For example, the application interface displayed on the touch screen may include a tab toolbar that provides the user with an indication of how many tabs are open in the application and an identifier (e.g., a tab title) for the open tabs. The tab toolbar may also allow the user to determine which tab the user is switching to, how many tabs are being skipped (if any), and/or how tong of a swipe gesture to make to get to a desired tab.

Figure 3A:
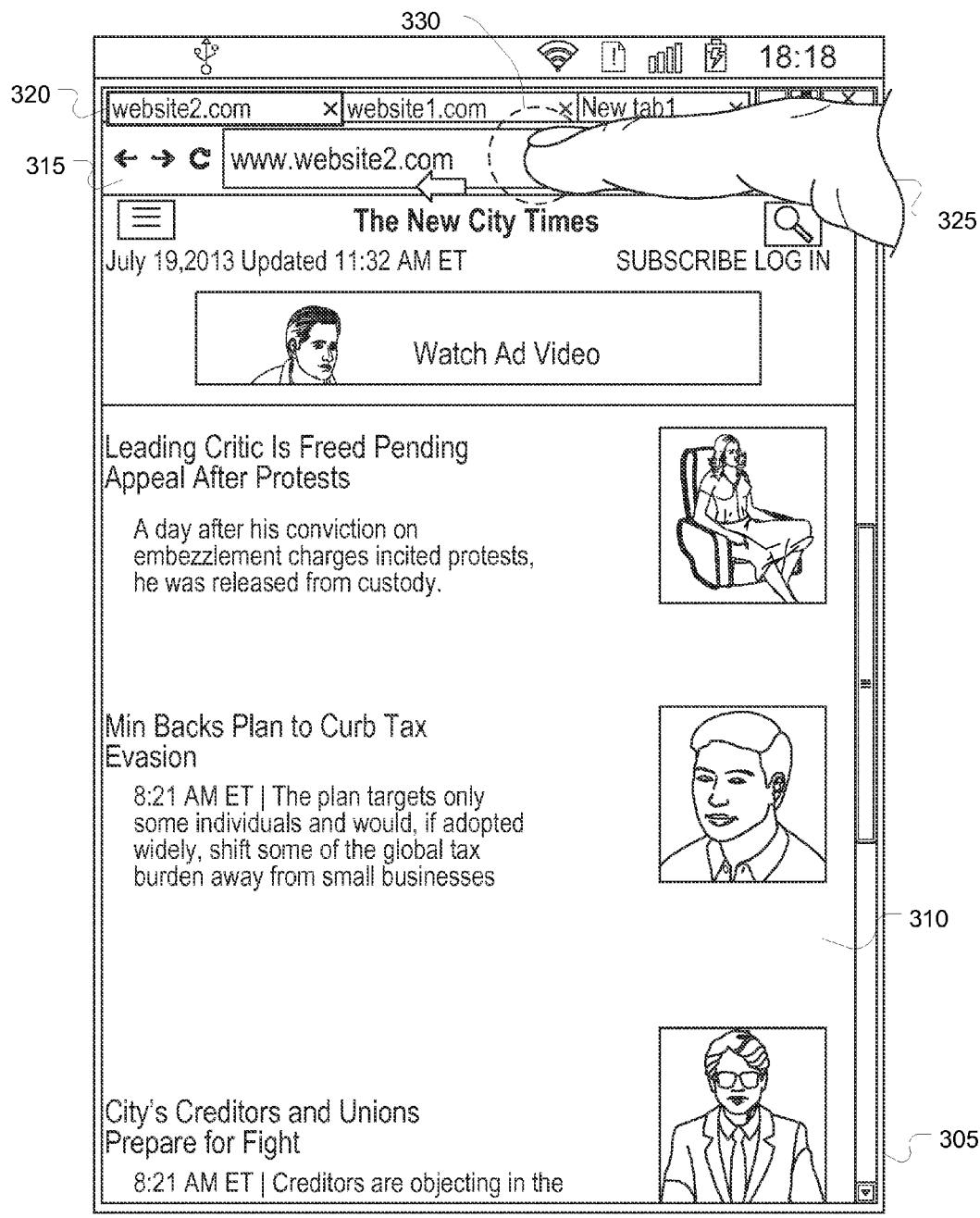
FIG. 3A, FIG. 3B, and FIG. 3C are diagrams illustrating an example scenario where an application interface including a tab toolbar switches tabs in response to a swipe gesture, in accordance with various aspects of the subject technology.
Figure 3B:
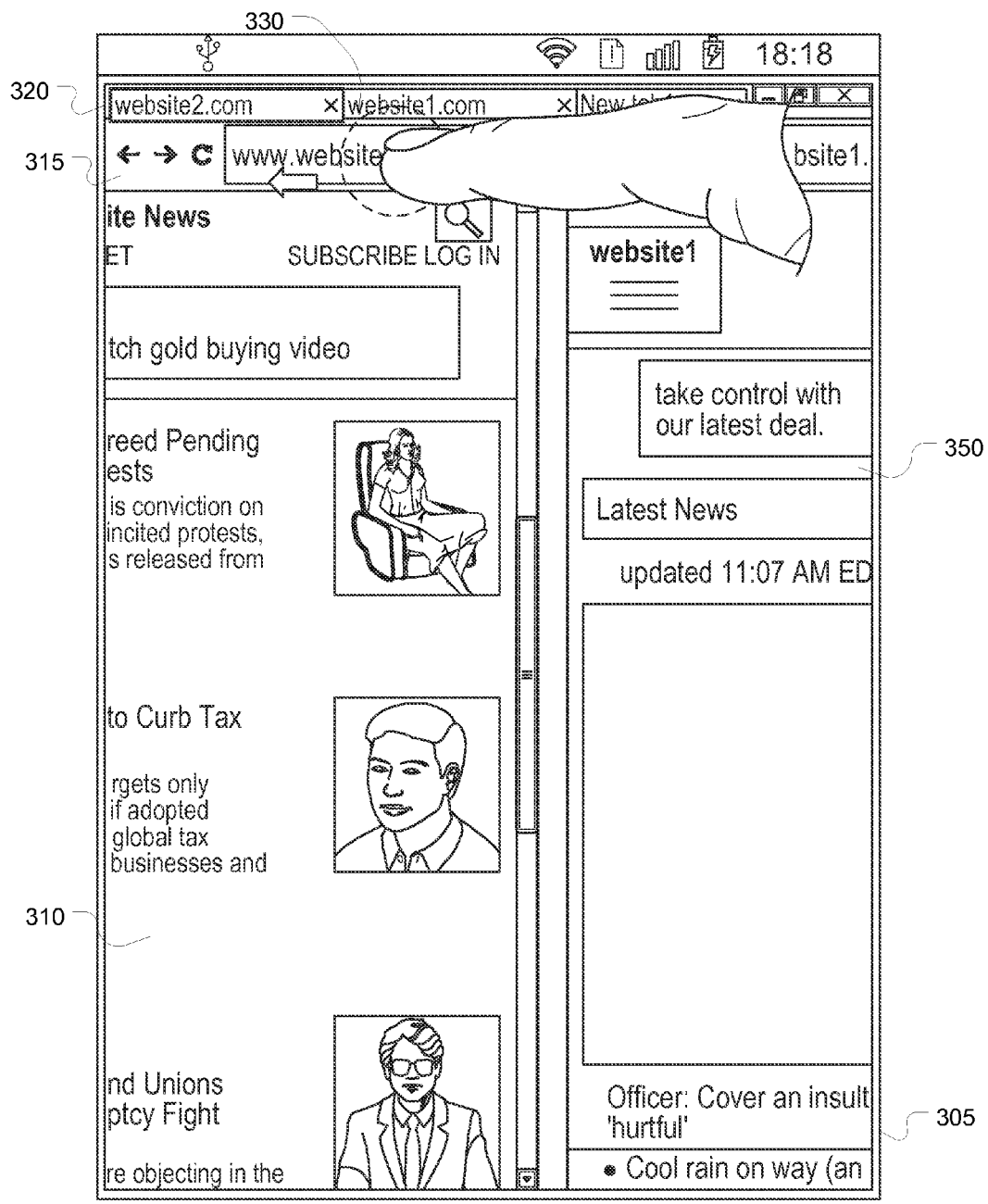
Figure 3C:
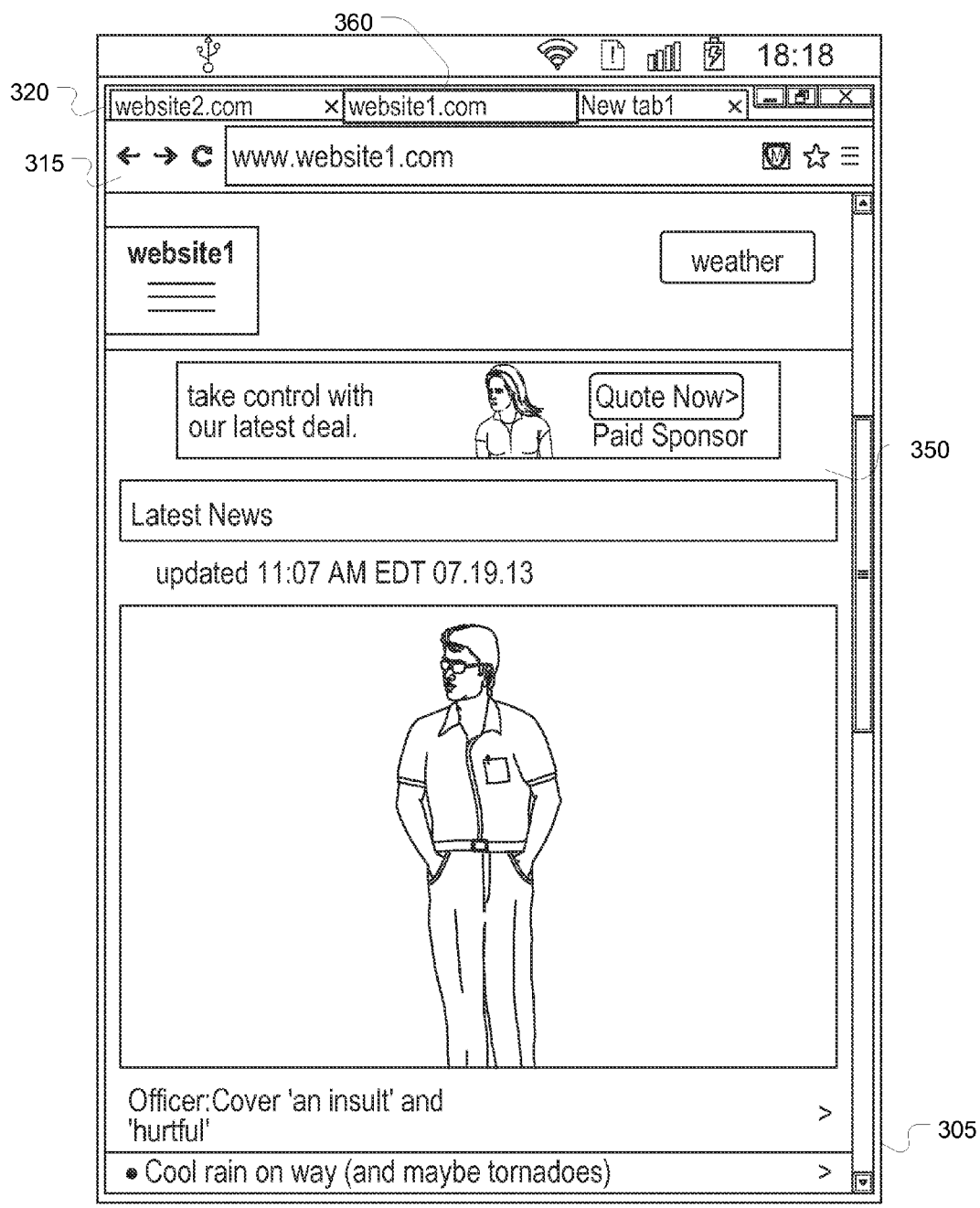

FIG. 3A, FIG. 3B, and FIG. 3C are diagrams illustrating an example scenario where an application interface 305 including a tab toolbar 260 switches tabs in response to a swipe gesture, in accordance with various aspects of the subject technology. FIG. 3A shows an application interface 305 in the form of a web browser displayed on a touch screen. The application interface 305 may correspond to an application in which multiple tabs are open, however only the content of one tab 310 is shown in the application interface 305.

A toolbar 315 is displayed in the application interface 305 and is configured to receive and display the location or source of the content loaded in the displayed tab 310. For example, in FIG. 3A, the toolbar 315 is an address toolbar for the web browser that displays a uniform resource locator (URL) field. In particular, the address toolbar indicates that the content for the currently active tab 310 is from the URL "www.website2.com."

FIG. 3A also shows an additional user interface component that provides the user with an indication of the tabs that are open in the application. The additional user interface in the application interface 305 is in the form of a tab toolbar 320. In addition to indicating which tabs are open in the application, the tab toolbar also provides a visual indication to the user of which tab is active (e.g., identifying a tab whose content is shown in the application interface 305). In the scenario illustrated in FIG. 3A, the tab for "website2.com" is the active tab and the other tab for "website1.com" is the inactive tab whose content is not presently shown in the application interface 305. Accordingly, the visual indicator associated with the active tab is highlighted or otherwise set apart from the inactive tab. In some cases, the tab toolbar 320 may also be used to select which tab to switch to.

A user may initiate a swipe gesture 330 by making contact with the touch screen with a finger 325 and longitudinally dragging the finger 325 on the touch screen along the length of the address toolbar 315, as seen in FIG. 3A. The swipe gesture 330 in FIG. 3A is shown occurring from the right to the left. However, swipe gestures 330 may also occur from the right to the left. As the swipe gesture 330 on the address toolbar 315 occurs, the content of the active tab 310 shown in FIG. 3A may be dragged to the left, as can be seen in FIG. 3B.

FIG. 3B shows that as the swipe gesture 330 continues to the left, the content of the tab 310 previously displayed in the application interface 305 is dragged to the left and the content of another tab 350 open in the application begins to appear in the application interface 205. The content of tab 310 is dragged such that location of the point of contact between the user's finger 325 is the same relative to the displayed content of tab 310 and the toolbar 315. As seen in the tab toolbar 320, the visual indicator associated with the tab 310 remains highlighted or otherwise set apart from the inactive tabs until the tabs are switched.

The user may reverse the direction of the swipe gesture 330 if the user desires and return to the right at any time before a swipe threshold is reached. In response to reversing the swipe direction, the content of the tab 310 may be dragged back to the right and return to its original position as seen in FIG. 3A. Accordingly, the user may have a preview of the content of the tab 350 to the right of tab 310 and, if the user does not wish to switch tabs, the user can return the application interface 305 to its original view using the same swipe gesture 330.

If, on the other hand, the user wishes to switch tabs to the tab 350 to the right of tab 310, the user may continue the swipe gesture 330. Once the swipe gesture 330 reaches the swipe threshold, the switching of the tabs from tab 310 to tab 350 will occur. When the tabs are switched, the highlighted visual indicator on the toolbar 320 will switch from the visual indicator for tab 310 to the visual indicator for tab 350 and the content of tab 350 will be displayed in the application interface.

As is seen in FIG. 2C, the switching of tabs from tab 310 to tab 350 is complete and the content of tab 350, the new active tab, is displayed in the application interface 305. The application interface 305 is also shown with the address toolbar 315 showing the URL ("www.website1.com") for the new active tab 350. Furthermore, the visual indicator 360 for tab 350 is also highlighted in the tab toolbar 320.

Although various aspects of the subject technology are discussed with respect to switching from one tab to an adjacent tab, in other aspects, the tab switching module 130 may switch to tabs that are not adjacent to the active tab. For example, for an application that has multiple tabs open, the tab switching module 130 may switch from one tab to another tab based a length of the swiping gesture or a starting point and ending point of a swiping gesture.

In some aspects, the tab switching module 130 may scroll through the tabs open in the application as the swipe gesture continues from a starting location to an ending point. For example, a short swipe gesture in one direction may cause the active tab to switch from one tab to an adjacent tab. A longer swipe gesture in the same direction may cause the active tab to scroll through one or more tabs until the swipe gesture ends.

According to various aspects of the subject technology, the tab toolbar 320 may also provide the user with an indication of how many tabs are open in the application and also allow the user to determine which tab the user is switching to by seeing which visual indicator corresponding to an open tab is highlighted, how many tabs are being skipped (if any), and/or how long of a swipe gesture to make to get to a desired tab.

Figure 4:
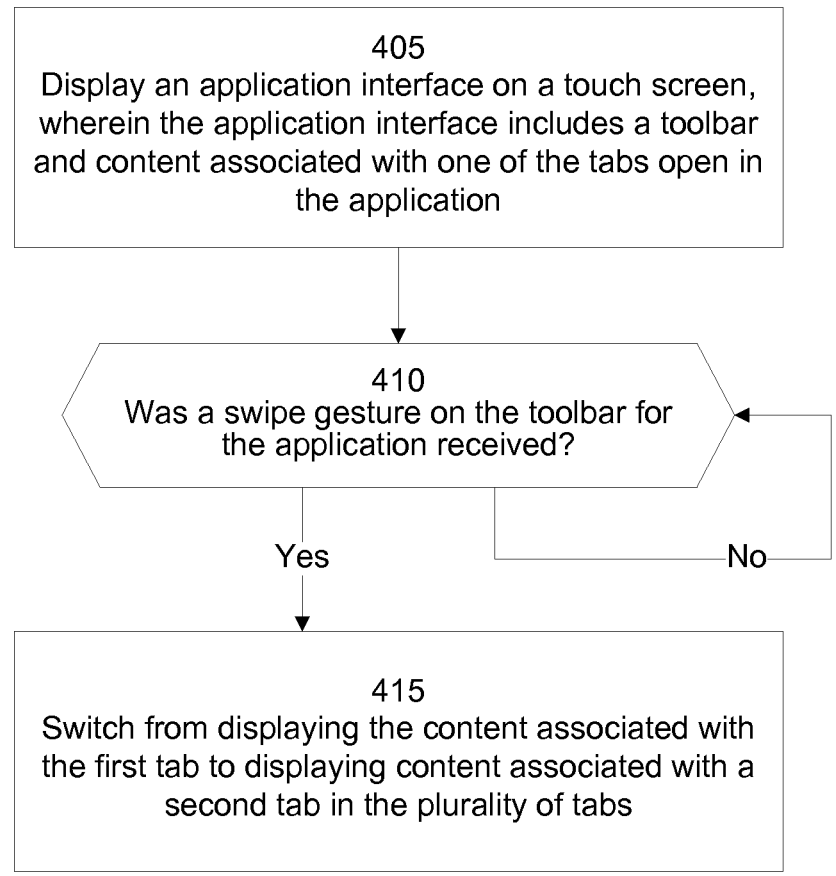
FIG. 4 is a flowchart illustrating an example process for switching tabs in an application, in accordance with various aspects of the subject technology.

FIG. 4 is a flowchart illustrating an example process 400 for switching tabs in an application, in accordance with various aspects of the subject technology. Although the steps in FIG. 4 may be discussed with respect to the components of computing device 100 illustrated in FIG. 1, the steps are not limited to these components. Furthermore, although the steps are shown in one particular order, other orderings of steps are also possible. For example other orderings may include additional steps, fewer steps, or steps that occur in parallel.

At block 405, the display interface 110 may provide for the displaying of an application interface on a display device, such as a touch screen. Although the application associated with the application interface may have multiple tabs open, only the content of one of the tabs is displayed in the application interface along with a toolbar (e.g., an address toolbar) configured to receive a swipe gesture.

The input interface 120, at block 410, may determine whether a swipe gesture on the toolbar has been received by an input device, such as the touch screen. If no swipe gesture is received, the input interface 120 may continue to monitor input signals from the touch screen. If a swipe gesture is detected, at block 415, the tab switching module 130 may switch from displaying the content associated with the first tab to displaying content associated with a second tab open in the application.

According to some aspects, when a swipe gesture on a touch screen is received, the input interface 120 may determine whether the location of the swipe gesture corresponds to the location of the address toolbar in the application interface. If the swipe gesture corresponds to the location of the address toolbar, the input interface 120 may determine one or more swipe characteristics such as a swipe direction or how long the swipe gesture is. The tab switching module 130 may then use the swipe characteristics to select an open tab to switch to and switch to that tab.

Figure 5:
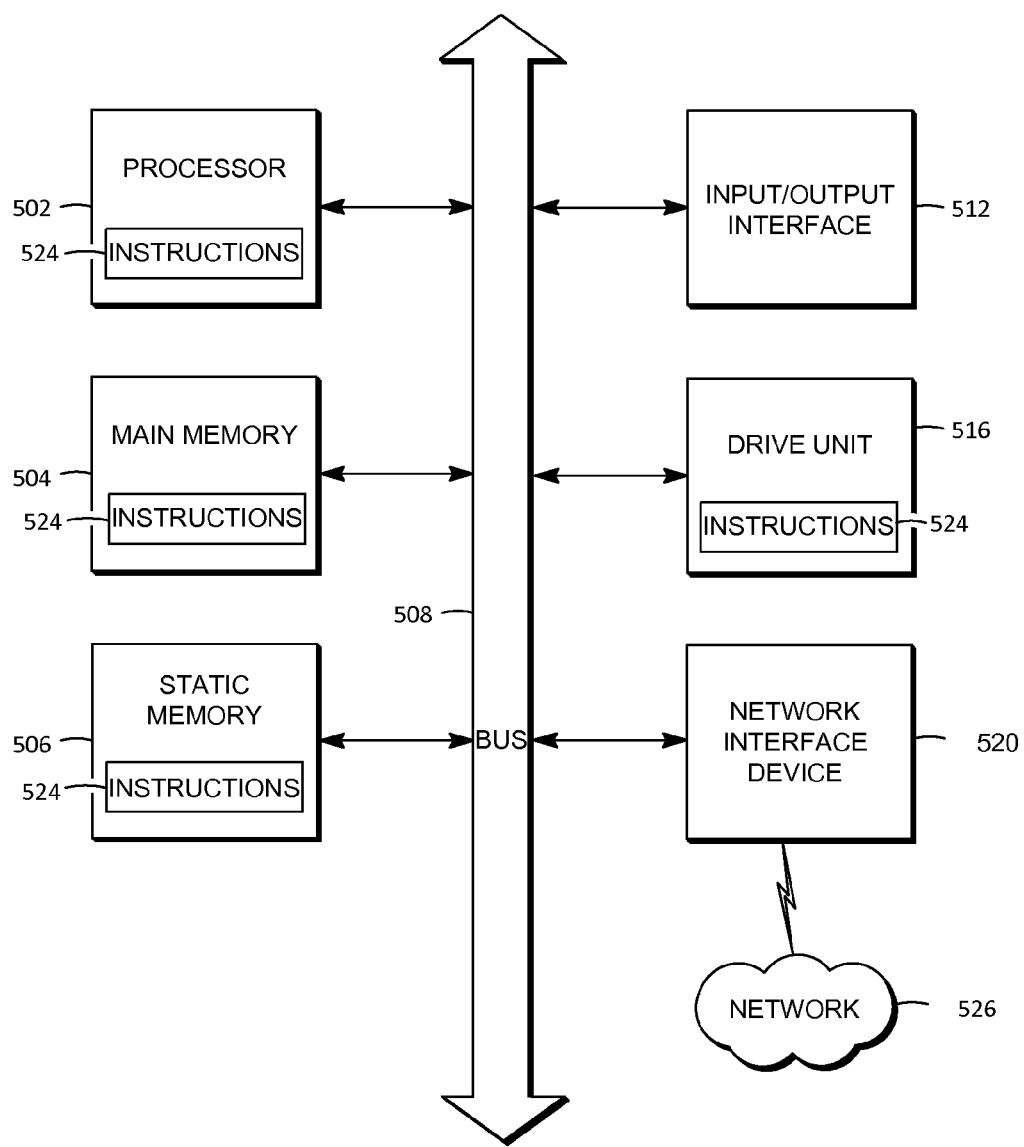
FIG. 5 is a block diagram illustrating an example computer system 500 with which any of the computing devices described herein may be implemented.

FIG. 5 is a block diagram illustrating an example computer system 500 with which any of the computing devices described herein may be implemented. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may comprise the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A computer-implemented method for switching tabs in an application, the method comprising:
    displaying an application interface on a touch screen, the application interface comprising at least an address toolbar and content associated with a first tab from a plurality of tabs open in the application;
    receiving, on the touch screen, a swipe gesture on the address toolbar in the application interface;
    displaying, in response to the receiving of the swipe gesture, a preview portion of content associated with a second tab from the plurality of tabs while the swipe gesture is being received; and
    switching, in response to the the swipe gesture satisfying a predetermined threshold, from displaying the content associated with the first tab to displaying the content associated with the second tab in the plurality of tabs.

2. The computer-implemented method of claim 1, wherein the application is a web browser, and wherein the address toolbar is for the web browser and is configured to receive and display a uniform resource locator (URL).

3. The computer-implemented method of claim 1, wherein the application interface displayed on the touch screen comprises a user interface component containing a visual indication representing each tab in the plurality of tabs open in the application.

4. The computer-implemented method of claim 3, wherein the visual indication for the tab, having content displayed in the application interface, is highlighted.

5. The computer-implemented method of claim 4, wherein the switching from displaying the content associated with the first tab to displaying content associated with a second tab comprises removing a highlighting from the visual indication for the first tab and highlighting the visual indication for the second tab.

6. The computer-implemented method of claim 1, further comprising:
    determining a direction for the swipe gesture; and
    selecting, based on the direction for the swipe gesture, the second tab from the plurality of tabs open in the application.

7. The computer-implemented method of claim 1, further comprising:
    determining a length of the swipe gesture; and
    selecting, based on the length of the swipe gesture, the second tab from the plurality of tabs open in the application.

8. The computer-implemented method of claim 1, wherein the second tab is adjacent to the first tab.

9. The computer-implemented method of claim 1, wherein the swipe gesture is a horizontal swipe gesture.

10. The computer-implemented method of claim 1, wherein the address toolbar is positioned horizontally at a top portion of the application interface.

11. A system for switching tabs in an application, the system comprising:
    one or more processors; and
    a machine-readable medium comprising instructions stored therein, which when executed by the one or more processors, cause the one or more processors to perform operations comprising:
        providing for display an application interface, the application interface comprising an address toolbar and content associated with a first tab from a plurality of tabs open in the application;
        receiving, via an input device, a swipe gesture on the address toolbar in the application interface;
        displaying, in response to the receiving of the swipe gesture, a preview portion of content associated with a second tab from the plurality of tabs while the swipe gesture is being received; and
        switching, in response to the swipe gesture satisfying a predetermined threshold, from displaying in the application interface the content associated with the first tab to displaying content associated with the second tab in the plurality of tabs.

12. The system of claim 11, wherein the input device is a touch screen and the application interface is displayed on the touch screen.

13. The system of claim 11, wherein the application is a web browser, and wherein the address toolbar is for the web browser and is configured to receive and display a uniform resource locator (URL).

14. The system of claim 11, wherein the application interface is displayed on a touch screen and comprises a user interface component containing a visual indication representing each tab in the plurality of tabs open in the application, and wherein the visual indication for the tab whose content is displayed in the application interface is highlighted.

15. The system of claim 11, wherein the operations further comprise:
   determining a direction for the swipe gesture; and
   selecting, based on the direction for the swipe gesture, the second tab from the plurality of tabs open in the application.

16. The system of claim 11, wherein the operations further comprise:
   determining a length of the swipe gesture; and
   selecting, based on the length of the swipe gesture, the second tab from the plurality of tabs open in the application.

17. A non-transitory machine-readable medium comprising instructions stored therein, which when executed by a machine, cause the machine to perform operations comprising:
   displaying a browser interface on a touch screen, the browser interface comprising an address toolbar and content associated with a first tab from a plurality of tabs open in a web browser;
   receiving, on the touch screen, a swipe gesture on the address toolbar in the browser interface;
   displaying, in response to the receiving of the swipe gesture, a preview portion of content associated with a second tab from the plurality of tabs while the swipe gesture is being received; and
   switching, in response to the swipe gesture satisfying a predetermined threshold, from displaying the content associated with the first tab to displaying content associated with the second tab in the plurality of tabs.

18. The non-transitory machine-readable medium of claim 17, wherein the browser interface displayed on the touch screen comprises a user interface component containing a visual indication representing each tab in the plurality of tabs open in the browser interface, and wherein the visual indication for the tab whose content is displayed in the browser interface is highlighted.

19. The non-transitory machine-readable medium of claim 17, wherein ti operations further comprise:
   determining a direction for the swipe gesture; and
   selecting, based on the direction for the swipe gesture, the second tab from the plurality of tabs open in the web browser.

20. The non-transitory machine-readable medium of claim 17, wherein the operations further comprise:
   determining a length of the swipe gesture; and
   selecting, based on the length of the swipe gesture, the second tab from the plurality of tabs open in the web browser.

* * * * *

UNITED STATES PATENT AND TRADEMARK OFFICE
CERTIFICATE OF CORRECTION

PATENT NO. : 9,569,004 B2  
APPLICATION NO. : 13/973970  
DATED : February 14, 2017  
INVENTOR(S) : David Andrew Trainor et al.

Page 1 of 1

It is certified that error appears in the above-identified patent and that said Letters Patent is hereby corrected as shown below:

In the Claims

Claim 19, Column 12, Line 19, "wherein ti operations" should read --wherein the operations--.

Signed and Sealed this  
First Day of October, 2019

Andrei Iancu  
*Director of the United States Patent and Trademark Office*